(12) United States Patent  (10) Patent No.: US 6,690,457 B2
Yamaguchi  (45) Date of Patent: Feb. 10, 2004

(54) OPTICAL INCLINATION SENSOR

(75) Inventor: Akifumi Yamaguchi, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 24 days.

(21) Appl. No.: 09/983,587

(22) Filed: Oct. 25, 2001

(65) Prior Publication Data

US 2002/0071114 A1 Jun. 13, 2002

(30) Foreign Application Priority Data

Oct. 25, 2000 (JP) .................................... P2000-325931

(51) Int. Cl.$^7$ ...................... G01B 11/26; H01H 35/02; G01D 5/34
(52) U.S. Cl. ................ 356/139.1; 200/61.45; 200/61.52; 250/231.1; 73/366.23
(58) Field of Search .................. 73/366.23; 250/231.1; 200/61.45, 61.52; 356/139.1

(56) References Cited

U.S. PATENT DOCUMENTS 5,202,559 A * 4/1993 Durst .................. 250/231.1
5,278,414 A * 1/1994 Samuelson et al. ......... 250/349
5,373,153 A * 12/1994 Cumberledge et al. .. 250/231.1
6,392,223 B1 * 5/2002 Hjertman et al. ........ 250/231.1

FOREIGN PATENT DOCUMENTS

JP   A8-226818   9/1996
JP   A11-14350   1/1999

OTHER PUBLICATIONS

ALPS, Multi Tilt Sensors, SPSE Series, 1998.

* cited by examiner

*Primary Examiner*—Stephen C. Buczinski
(74) *Attorney, Agent, or Firm*—Birch, Stewart, Kolasch & Birch, LLP (57) ABSTRACT

An object of the invention is to detect four conditions, namely upright, rightwardly inclined, leftwardly inclined and inverted conditions. A casing has a housing space formed therein, and has an inner surface symmetrical with respect to an axis. In the housing space of the casing, a detection object that rolls along the inner surface around the axis is housed. The inner surface of the casing is octagonal within a virtual plane vertical to the axis, and adjoining sides of the octagon are different in length. The detection object in the housing space of the casing is stably held when situated on one of the four shorter sides of the octagon, and the position of the detection object being held is detected by a light emitting element and a light receiving element.

11 Claims, 9 Drawing Sheets

OPTICAL INCLINATION SENSOR

BACKGROUND OF THE INVENTION

1. Field of the Invention

The present invention relates to an optical inclination sensor provided in various apparatuses such as electronic cameras and robots for detecting the inclination condition of the apparatuses.

2. Description of the Related Art

Figure 7:
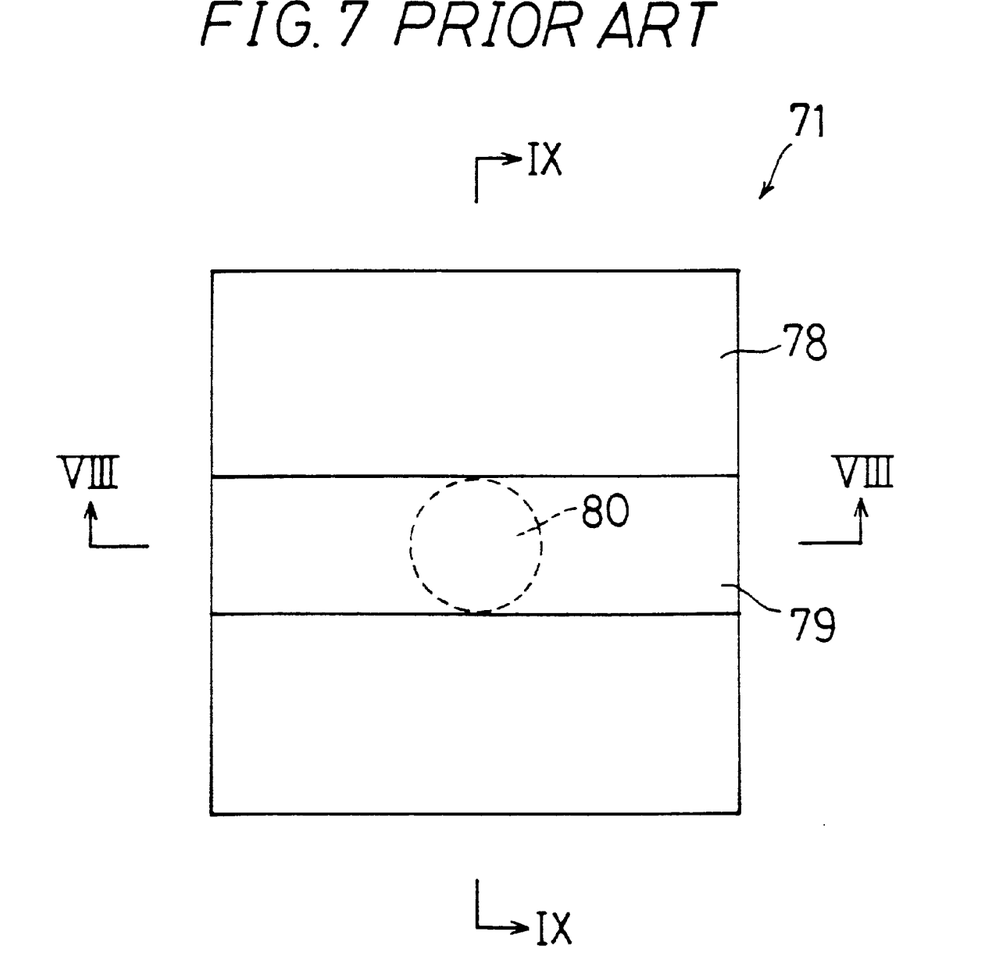
FIG. 7 is a plan view showing the structure of the conventional optical inclination sensor in a simplified form.
Figure 8:
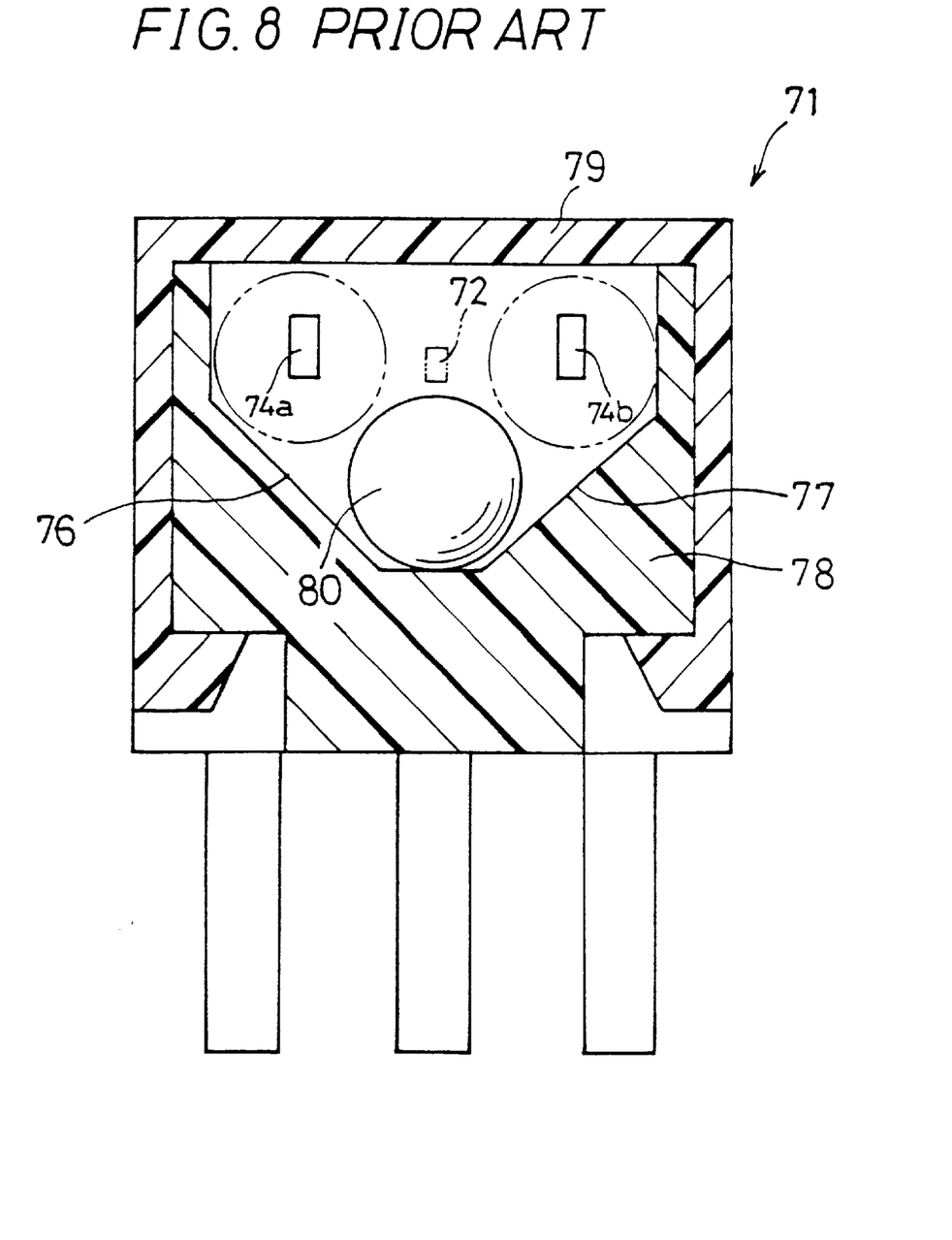
FIG. 8 is a cross-sectional view taken on the line VIII—VIII of FIG. 7.
Figure 9:
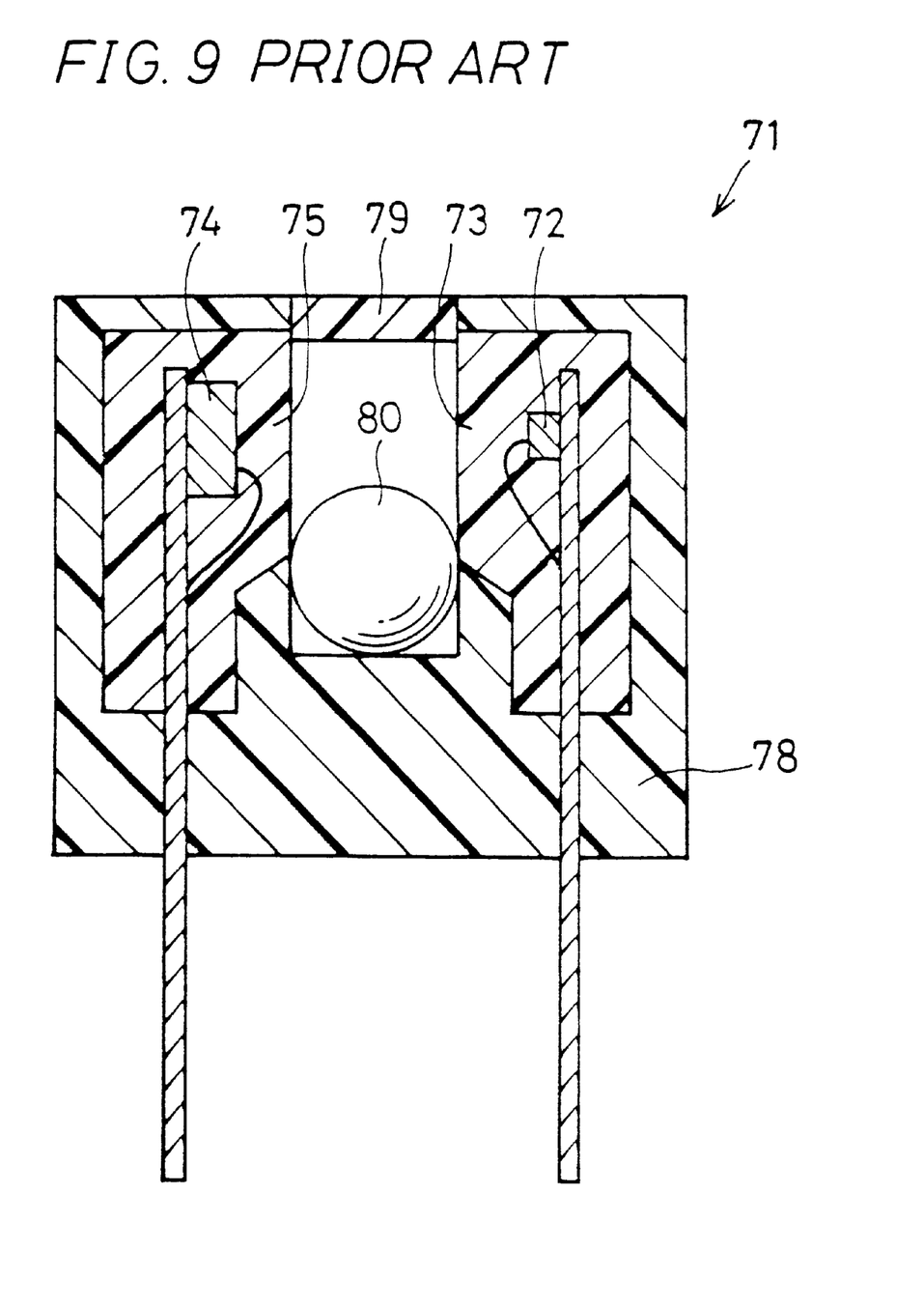
FIG. 9 is a cross-sectional view taken on the line IX—IX of FIG. 7.

Conventional optical inclination sensors using a sphere are disclosed, for example, in Japanese Unexamined Patent Publication JP-A 11-14350 (1999). FIG. 7 is a plan view showing the structure of a conventional optical inclination sensor 71 in a simplified form. FIG. 8 is a cross-sectional view taken on the line VIII—VIII of FIG. 7. FIG. 9 is a cross-sectional view taken on the line IX—IX of FIG. 7.

The conventional optical inclination sensor includes a light emitting section 73 including a single light emitting element 72; a light receiving section 75 including a light receiving element 74 having two light receiving surfaces 74a and 74b that receive diffused light from the light emitting section 73; a holder 78 holding the light emitting section 73 and the light receiving section 75 and having two inclined surfaces 76 and 77 forming a predetermined angle with each other; a lid 79 fitted to the holder 78; and a sphere 80 serving as a detection object that moves freely on the two inclined surfaces 76 and 77 of the holder 78. The conventional sphere 80 is made of iron and has a diameter of 1.0 to 1.2 mm, and a surface roughing treatment is performed on the surface of the sphere 80.

In the conventional optical inclination sensor 71, when the holder 78 is upright without inclined, the diffused light from the light emitting section 73 is received by the two light receiving surfaces 74a and 74b, and when the holder 78 is inclined rightward or leftward, the sphere 80 moves to the end of the inclined surface in the direction in which the holder 78 is inclined, so that the light is intercepted from one of the two light receiving surfaces 74a and 74b and is received by the other of the surfaces 74a and 74b.

The conventional optical inclination sensor 71 faces the following problem. The holder 78 only has the two inclined surfaces 76 and 77 forming the predetermined angle with each other, and the surface of the lid 79 facing the sphere 80 is a plane. Therefore, when the holder 78 is upright without being inclined, the sphere 80 is situated midway between the two inclined surfaces 76 and 77, and the two light receiving surfaces 74a and 74b both receive the diffused light from the light receiving surfaces 74a and 74b both receive the diffused light from the light emitting section 73. When the holder 78 is inclined rightward or leftward, the sphere 80 moves to the end of one of the two inclined surfaces 76 and 77, so that the diffused light from the light emitting section 73 is intercepted from one of the two light receiving surfaces 74a and 74b and is received by the other of the surfaces 74a and 74b. As described above, the optical inclination sensor 71 can detect only three conditions, namely an upright condition where the holder 78 is not inclined, a rightwardly inclined condition where the holder 78 is inclined leftward, and cannot detect a condition where the holder 78 is inverted.

Moreover, since the two light receiving surfaces 74a and 74b receive the diffused light from the light emitting section 73 when the holder 78 is in the upright condition, in the case where the optical inclination sensor 71 is provided in an apparatus frequently used in the upright condition, the light is incident on the light receiving section 75, so that a condition where current flows through the light receiving section 75 continues for a long time. This increases power consumption.

Further, since the sphere 80 used for the conventional optical inclination sensor 71 is small in mass, when the optical inclination sensor 71 is inclined, there are cases where the sphere 80 stays in contact with the holder 78 and does not move due to static electricity. Therefore, in order for the sphere 80 to easily move when the optical inclination sensor 71 is inclined, although the cost of manufacturing increases, a surface roughing treatment is performed on the surface of the sphere 80 to reduce the area of contact of the sphere 80 with the holder 78. However, the angle of inclination of the optical inclination sensor 71 at which the sphere 80 starts to move is not always the same but varies largely.

SUMMARY OF THE INVENTION

An object of the invention is to provide an optical inclination sensor capable of detecting four conditions, namely an upright condition, a rightwardly inclined condition, a leftwardly inclined condition and an inverted condition, and in which power consumption can be reduced and the variation in the angle of inclination at which the detection object starts to move is small.

The invention relates to an optical inclination sensor for detecting a condition of inclination of an object to horizontal, the optical inclination sensor comprising:

a light emitting section including a light emitting element;

a light receiving section including a light receiving element having two light receiving surfaces;

a movable detection object for adjusting a light receiving condition of the light receiving section by blocking or opening paths of light from the light emitting section to the light receiving section;

a holder for housing the light emitting section, the light receiving section and the detection object, the holder having an inner surface including surfaces parallel to, vertical to and inclined to horizontal when the holder is in an upright condition; and a lid shaped to fit to the holder, the lid having an inner surface including surfaces parallel to and inclined to horizontal when the holder is in the upright condition and the lid is fitted thereto, wherein the detection object is movably housed in a housing space defined by the holder and the lid, and the path of light and the movement path of the detection object are formed so that the following conditions are distinctively detectable according to a position along the movement path of the detection object in the housing space:

the upright condition of the holder;
a rightwardly inclined condition of the holder;
a leftwardly inclined condition of the holder; and
an inverted condition of the holder.

According to the invention, the optical inclination sensor can detect the inclination conditions, that is, the four conditions, namely the upright, the rightwardly inclined, the leftwardly inclined and the inverted conditions. Consequently, although in the conventional optical inclination sensor capable of detecting only three conditions, namely the upright, the rightwardly inclined and the leftwardly inclined conditions, to detect the four conditions, it is necessary to provide in the apparatus two sensors disposed so as to be relatively rotated 90 degrees from each other, in the optical inclination sensor capable of detecting the four conditions, it is necessary to provide only one sensor in the apparatus. This reduces the cost of manufacturing, and reduces the space in the apparatus necessary for mounting the sensor to reduce the size of the apparatus.

In the invention it is preferable that the path of light and the movement path of the detection object are formed so that when the holder is in the upright condition, paths of light from the light emitting section to the two light receiving surfaces are both blocked by the detection object, when the holder is in the rightwardly or the leftwardly inclined condition, one of the paths of light from the light emitting section to the two light receiving surfaces is blocked by the detection object, and when the holder is in the inverted condition, the paths of light from the light emitting section to the two light receiving surfaces are both opened.

According to the invention, since the paths of light from the light emitting section to the two light receiving surfaces are both blocked when the holder is in the upright condition, in the case where the optical inclination sensor is used in an apparatus used being held in the upright condition for a long time, the time for which no current flows through the light receiving element is long, so that power consumption can be reduced.

Moreover, in the invention it is preferable that the paths of light and the movement path of the detection object are formed so that when the holder is in the upright condition, the paths of light from the light emitting section to the two light receiving surfaces are both opened, when the holder is in the rightwardly or the leftwardly inclined condition, one of the paths of light from the light emitting section to the two light receiving surfaces is blocked by the detection object, and when the holder is in the inverted condition, the paths of light from the light emitting section to the two light receiving surfaces are both blocked by the detection object.

According to the invention, since the paths of light from the light emitting section to the two light receiving surfaces are both blocked when the holder is in the inverted condition, in the case where the optical inclination sensor is used in an apparatus used being held in the inverted condition for a long time, the time for which no current flows through the light receiving element is long, so that power consumption can be reduced.

Moreover, in the invention it is preferable that the detection object is a sphere having a specific gravity of 7 or more and a diameter of 1.2 to 3.0 mm.

Moreover, in the invention it is preferable that the detection object has a surface roughness smaller than a predetermined value.

According to the invention, the detection object is a sphere having a specific gravity of 7 or more and a diameter of 1.2 to 3.0 mm, and the surface roughness of the detection object is smaller than the predetermined value. Since this provides the detection object with an appropriate mass, the detection object is never hindered from moving by static electricity, and the variation in the angle of inclination of the optical inclination sensor at which the detection object starts to move can be reduced. Further, by the mass of the detection object being in an appropriate range, the detection object having a surface roughness smaller than the predetermined value can be used as it is and it is unnecessary to perform a surface roughing treatment on the surface of the detection object in order that the detection object easily moves, so that the cost of manufacturing can be reduced.

Moreover, in the invention it is preferable that there are four inclined surfaces in all in the inner surfaces of the holder and the lid, and when the holder is in the upright condition and the lid is fitted thereto, angles between the surfaces parallel to horizontal and the inclined surfaces and angles between the surfaces vertical to horizontal and the inclined surfaces are substantially 45 degrees.

According to the invention, the holder and the lid have a total of four inclined surfaces, and when the holder is in the upright condition and the lid is fitted thereto, the angles between the surfaces parallel to horizontal and the inclined surfaces and the angles between the surfaces vertical to horizontal and the inclined surfaces are set substantially to 45 degrees, so that the four conditions, namely the upright, the rightwardly inclined, the leftwardly inclined and the inverted conditions can be detected each corresponding to 90 degrees into which 360 degrees corresponding the entire circumference of the inner surface of the holder and the lid defining the housing space is quartered.

Moreover, in the invention it is preferable that the holder and the lid have between adjoining inclined surfaces a holding surface formed so as to range from one to the other of the inclined surfaces, and the detection object is in contact with the inner surfaces of the holder and the lid defining the housing space at two contact points, namely a first contact point in contact with an inclined surface and a second contact point in contact with the holding surface.

Moreover, in the invention it is preferable that an angle between a first axis connecting the first contact point and a center of the detection object and a second axis connecting the second contact point and the center of the detection object is substantially 45 degrees.

According to the invention, since the detection object is in contact with the inner surface of the holder and the lid defining the housing space at two contact points and preferably, the angle between the axes connecting the contact points and the center of the detection object is substantially 45 degrees which form an acute angle, when the optical inclination sensor is inclined, the detection object smoothly moves, so that the variation in the angle of inclination of the optical inclination sensor at which the detection object starts to move can be reduced.

Moreover, in the invention it is preferable that a distance between the two light receiving surfaces is set to 0.5 to 1.5 mm.

According to the invention, since the distance between the two light receiving surfaces is set to 0.5 to 1.5 mm, the size of the detection object that blocks the paths of light from the light emitting element to the two light receiving surfaces is set in a range corresponding to the distance of 0.5 to 1.5 mm and suitable for blocking the paths of light. Since this prevents the detection object from being too big, the optical inclination sensor which houses the detection object can be reduced in size. Moreover, since the size of the detection object is never so small that the mass of the detection object is small, it never occurs that the detection object does not easily move due to static electricity, so that the variation in the angle of inclination of the optical inclination sensor at which the detection object starts to move can be reduced.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
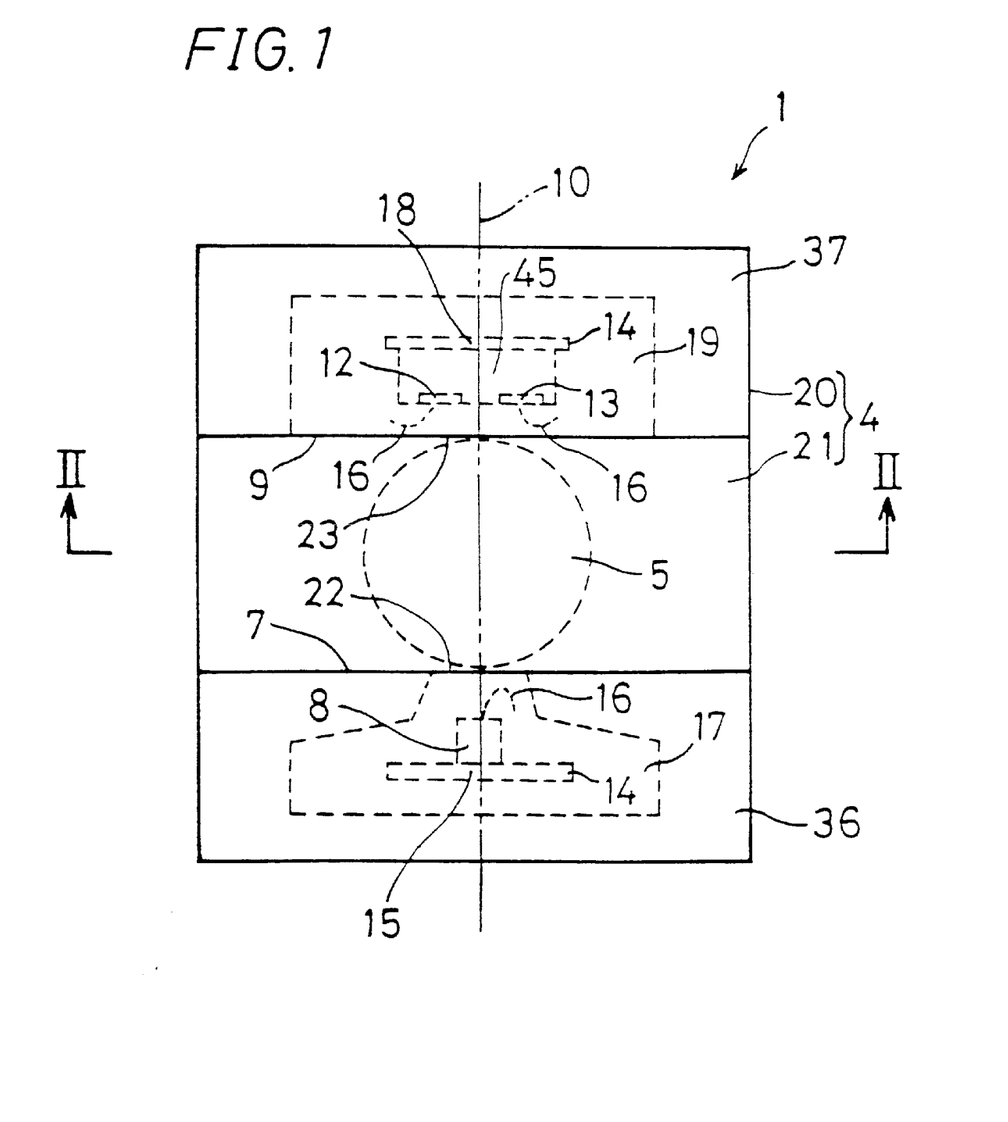
FIG. 1 is a plan view showing the structure of an optical inclination sensor according to an embodiment of the invention in a simplified form.
Figure 2:
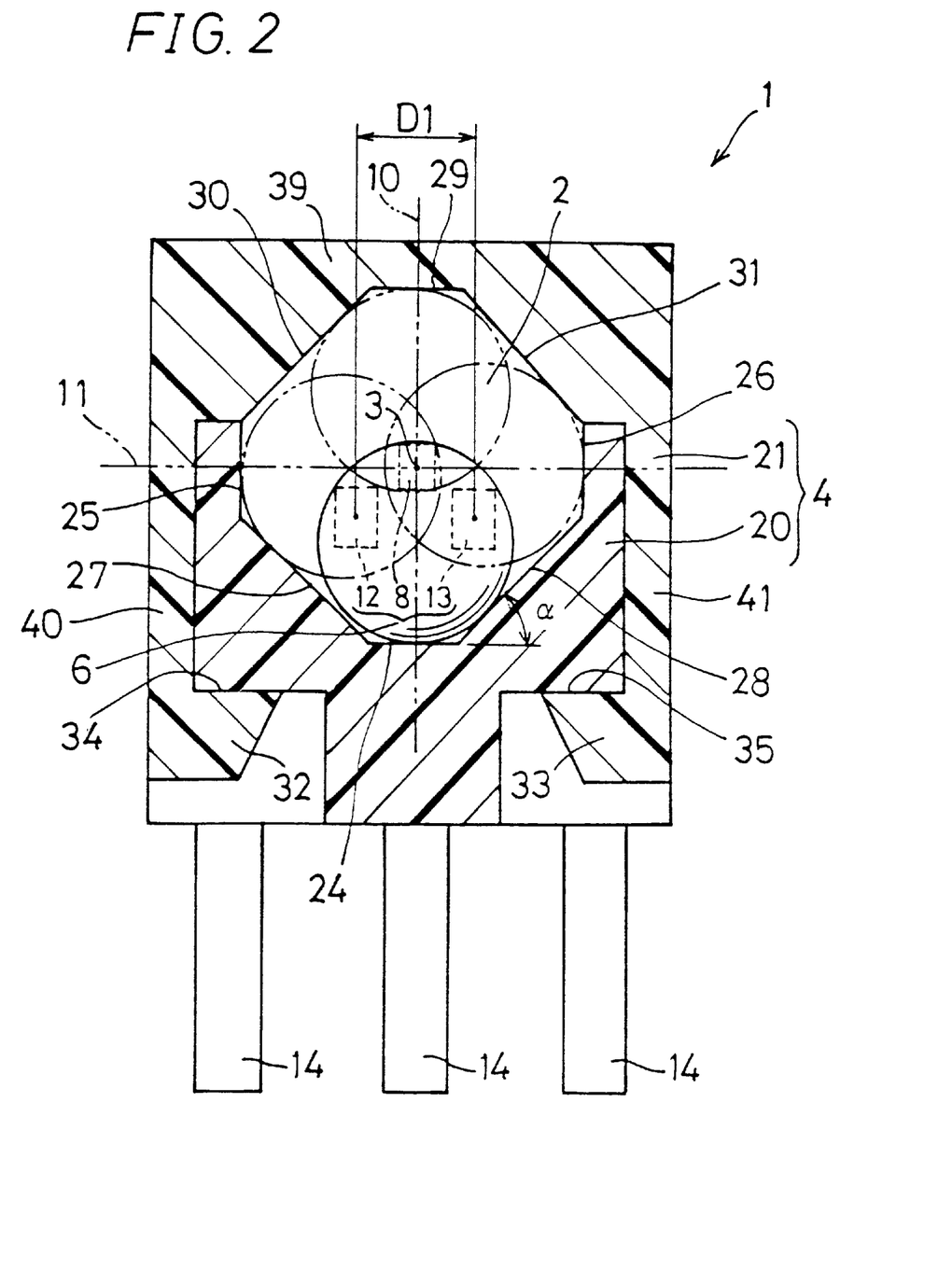
FIG. 2 is a cross-sectional view taken on the line II—II of FIG. 1.
Figure 3:
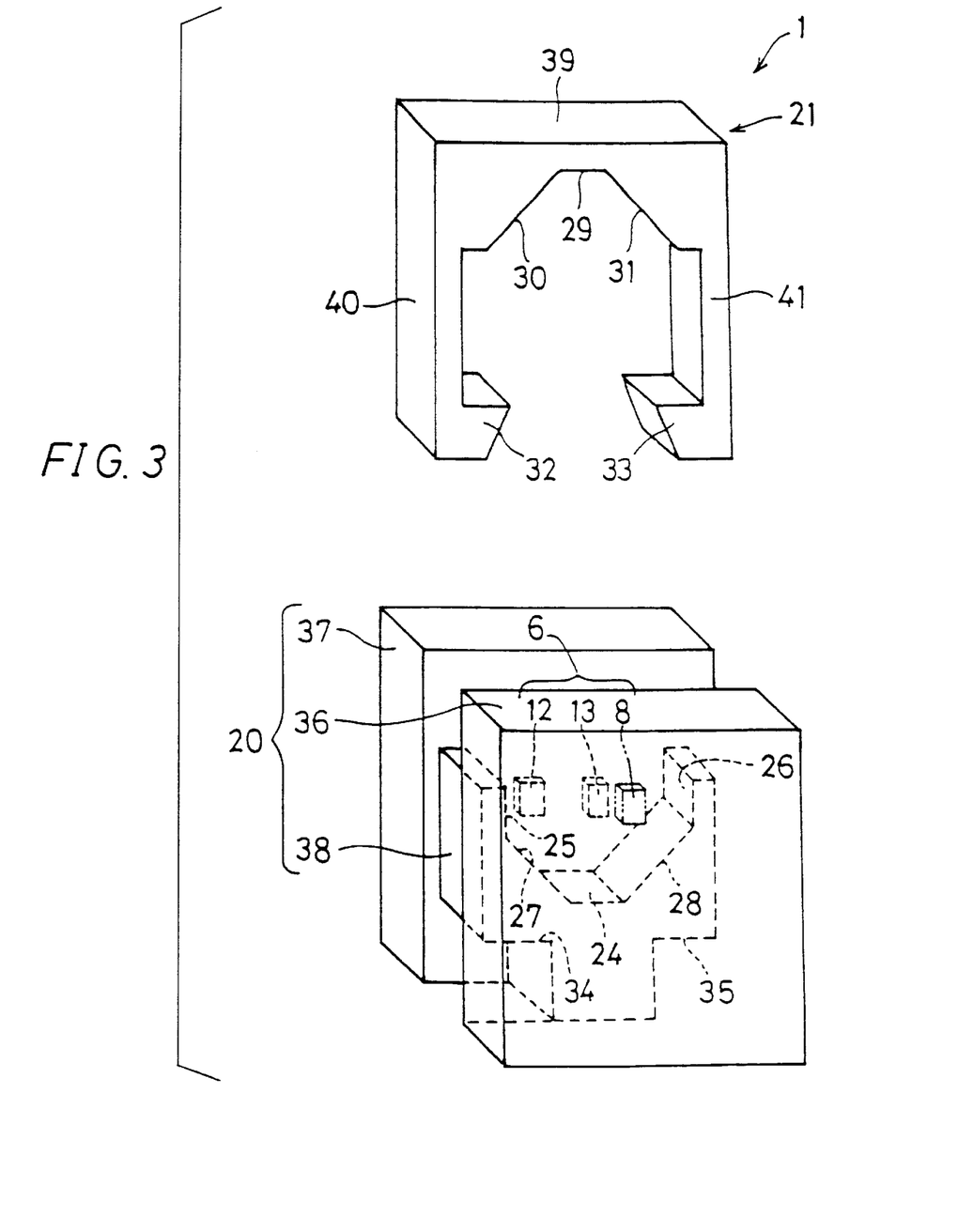
FIG. 3 is an exploded perspective view showing the structure of the optical inclination sensor of FIG. 1 in a simplified form.

FIG. 1 is a plan view showing the structure of an optical inclination sensor 1 according to an embodiment of the invention in a simplified form. FIG. 2 is a cross-sectional view taken on the line II—II of FIG. 1. FIG. 3 is an exploded perspective view showing the structure of the optical inclination sensor 1 of FIG. 1 in a simplified form.

The optical inclination sensor 1 detects an inclination condition of an object to horizontal. In this specification, the term "inclination condition" means the upright condition where an object is upright without inclined, the rightwardly inclined condition where an object is inclined rightward with respect to the upright condition, the leftwardly inclined condition where an object is inclined leftward with respect to the upright condition, and the inverted condition where an object is inverted with respect to the upright condition.

The optical inclination sensor 1 has a housing space 2 formed inside, and includes: a casing 4 having an inner surface symmetrical with respect to an axis 3; a detection object 5 housed in the housing space 2 and rolling along the inner surface of the casing 4 around the axis 3; and detecting means 6 for detecting the position of the detection object 5 in the housing space 2.

The detecting means 6 includes: a light emitting element 8 facing one opposing surface 7 vertical to the axis 3 and having the optical axis on the axis 3; and a light receiving element 45 having two light receiving surfaces, namely a first light receiving surface 12 and a second light receiving surface 13 which face the other opposing surface 9, are disposed symmetrically with respect to a first virtual plane 10 including the axis 3, and are disposed so as to be shifted downward from a second virtual plane 11 which is vertical to the first virtual plane 10 and includes the axis 3 when the optical inclination sensor 1 is in the upright condition.

The light emitting element 8 comprises a single element, and is mounted on a light emitting element mounting portion 15 of a lead frame 14. After the internal connection is made by a bonding wire 16 made, for example, of gold, the resulting assembly is encapsulated in epoxy resin. In this manner, a light emitting section 17 is formed.

The light receiving element 45 having the first and the second light receiving surfaces 12 and 13 is mounted on a light receiving element mounting portion 18 of the lead frame 14. After the internal connection is made by the bonding wire 16, the resulting assembly is encapsulated in epoxy resin. In this manner, a light receiving section 19 is formed. The centroid distance D1 between the first light receiving surface 12 and the second light receiving surface 13 is set to 0.5 to 1.5 mm.

The detection object 5 is a sphere having a specific gravity of 7 or more and a diameter of 1.2 to 3.0 mm. For example, a stainless steel sphere is suitable. The surface of the detection object 5 has not undergone a surface treatment such as a surface roughing treatment, and has a small surface roughness like the untreated surface of a stainless steel sphere for a bearing when the stainless steel sphere is received in the bearing. Since the detection object 5 is provided with an appropriate mass by having a specific gravity of 7 or more and a diameter in a range of 1.2 to 3.0 mm, the detection object 5 is prevented from being hindered from moving by static electricity without performing a surface roughing treatment on the surface thereof, and the variation in the angle of inclination of the optical inclination sensor 1 at which the detection object 5 starts to move can be reduced. Further, since it is unnecessary to perform a surface roughing treatment on the surface of the detection object 5, the cost of manufacturing can be reduced.

Moreover, as described above, the centroid distance D1 between the first light receiving surface 12 and the second light receiving surface 13 is set to 0.5 to 1.5 mm, and the detection object 5 blocking the paths of light from the light emitting element 8 to the first and the second light receiving surfaces 12 and 13 has a size corresponding to the centroid distance D1 and a diameter suitable for blocking the path of light. Consequently, the size of the detection object 5 is never too large, so that the size of the optical inclination sensor 1 which houses the detection object 5 can be reduced. Moreover, since the size of the detection object 5 is never so small that the mass of the detection object 5 is small, it never occurs that the detection object 5 does not easily move due to static electricity, so that the variation in the angle of inclination of the optical inclination sensor 1 at which the detection object 5 starts to move can be reduced.

The casing 4 includes a holder 20 and a lid 21. The holder 20 is integrally formed by placing the light emitting section 17 and the light receiving section 19 side by side with a predetermined distance in between and performing injection molding by use of a thermoplastic resin such as polyphenylene sulfide. Since a light emitting section side window 22 and a light receiving section side window 23 of the holder 20 are brought into intimate contact with the metal mold for injection molding so as not to be covered with the thermoplastic resin in the injection molding, the path of light from the light emitting section 17 to the light receiving section 19 is never blocked by the thermoplastic resin.

The holder 20 includes a first holder 36 for housing the light emitting section 17; a second holder 37 for housing the light receiving section 19; and a third holder 38 formed between the first and the second holders 36 and 37 so as to range therewith, for holding the detection object 5 together with the first and the second holders 36 and 37. The third holder 38 has an inner surface including a first parallel surface 24 parallel to horizontal in the upright condition, first and second vertical surfaces 25 and 26 vertical to horizontal in the upright condition, and first and second inclined surfaces 27 and 28 inclined to horizontal in the upright condition.

The lid 21 has an inverted U shape, and is made of an elastic synthetic resin. The lid 21 is fitted to the third holder 38 of the holder 20, and has an inner surface including a second parallel surface 29 parallel to horizontal when the holder 20 is upright and third and fourth inclined surfaces 30 and 31 inclined to horizontal when the holder 20 is upright. The lid 21 includes an upper lid 39, and first and second legs 40 and 41 ranging with the upper lid 39 and extending vertically from the ends of the upper lid 39. At the end of the first leg 40, a first latching portion 32 extending toward the second leg 41 is formed. At the end of the second leg 41, a second latching portion 33 extending toward the first leg 40 is formed. When the lid 21 is fitted to the holder 20, the first and the second legs 40 and 41 are elastically deformed and opened. Further, by moving the lid 21 toward the holder 20, the first latching portion 32 is engaged with a first holding portion 34 of the third holder 38 of the holder 20, and the second latching portion 33 is engaged with a second holding portion 35 of the third holder 38 of the holder 20, whereby fitting of the lid 21 to the holder 20 is completed. At this time, the first and the second legs 41 and 42 are in intimate contact with the third holder 38. Since the lid 21 fitted to the holder 20 is not easily detached because of the engagement between the first latching portion 32 and the first holding portion 34 and the engagement between the second latching portion 33 and the second holding portion 35, the detection object 5 never rolls out of the housing space 2 of the casing 4 when the optical inclination sensor 1 is inclined.

The inner surface of the housing space 2 defined by the holder 20 and the lid 21 is octagonal within a virtual plane vertical to the axis 3. The octagon is symmetrical with respect to the axis 3 and symmetrical with respect to a plane passing through the axis 3. The first to the fourth inclined surfaces 27, 28, 30 and 31, the first and the second parallel surfaces 24 and 29, and the first and the second vertical surfaces 25 and 26 each form a side of the octagon within the virtual plane vertical to the axis 3. Adjoining sides of the octagon, for example, the first parallel surface 24 and the first inclined surface 27 are different in length; the first inclined surface 27 is longer than the first parallel surface 24. That is, comparing the first to the fourth inclined surfaces 27, 28, 30 and 31 with the first and the second parallel surfaces 24 and 29 or the first and the second vertical surfaces 25 and 26, the first to the fourth inclined surfaces 27, 28, 30 and 31 are longer.

When the optical inclination sensor 1 is in an inclination condition, that is, in one of the upright condition, the inverted condition, the leftwardly inclined condition and the rightwardly inclined condition, the detection object 5 is stably held by one of the first parallel surface 24, the second parallel surface 29, the first vertical surface 25 and the second vertical surface 26 forming shorter sides of the inner surface of the casing 4, and the position where the detection object 5 is held is detected by the detecting means 6, so that the four conditions of the optical inclination sensor 1 at the position where the detection object 5 is held stably can be detected. Here, the angle between the first to the fourth inclined surfaces 27, 28, 30 and 31 and the first and the second parallel surfaces 24 and 29 and the angle between the first to the fourth inclined surfaces 27, 28, 30 and 31 and the first and the second vertical surfaces 25 and 26, showing a concrete example, the angle α between the first parallel surface 24 and the second inclined surface 28 in FIG. 2 is set substantially to 45 degrees, so that the four conditions, namely the upright, the rightwardly inclined, the leftwardly inclined and the inverted conditions can be detected each corresponding to a quarter of 360 degrees corresponding to the entire circumference of the inner surface of the holder 20 and the lid 21 defining the housing space 2.

Figure 4A:
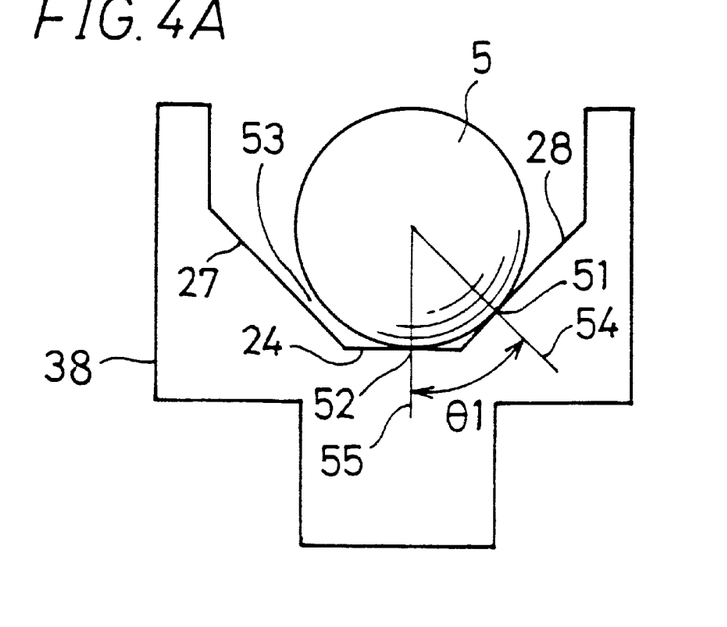
FIGS. 4A and 4B are views showing conditions where a detection object is held on the inner surface of a casing when the optical inclination sensor is in the upright condition.
Figure 4B:
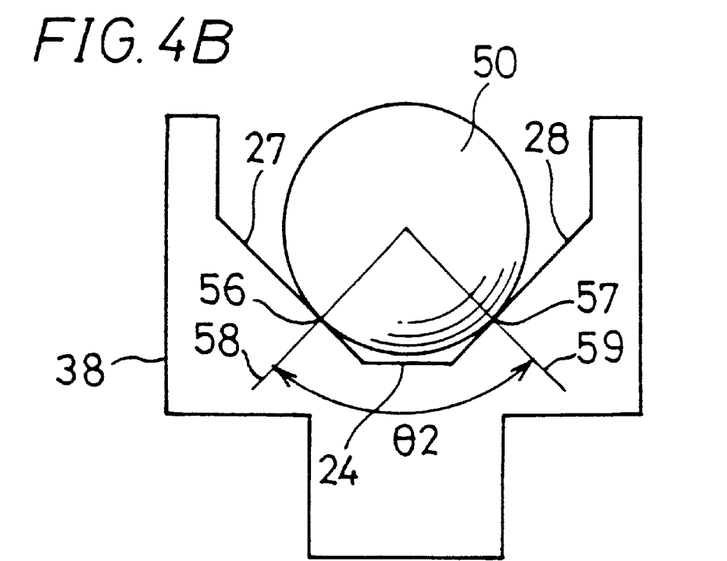

The first and the second parallel surfaces 24 and 29 and the first and the second vertical surfaces 25 and 26 forming the shorter sides of the octagon function as holding surfaces that hold the detection object 5 stably when the optical inclination sensor 1 is in the upright, the rightwardly inclined, the leftwardly inclined and the inverted conditions. FIGS. 4A and 4B are views showing conditions where the detection object 5 is held on the inner surface of the casing 4 when the optical inclination sensor 1 is in the upright condition. FIG. 4A shows a condition where the detection object 5 is held so as to be in contact with the first parallel surface 24 and the second inclined surface 28 functioning as holding surfaces. FIG. 4B shows a condition where a detection object 50 is held so as to be in contact with the first inclined surface 27 and the second inclined surface 28.

In this embodiment, the size of the detection object 5 is set so as to satisfy the following requirements: The case where the optical inclination sensor 1 is in the upright condition will be described as an example, and the cases of the other three conditions will not be described because the cases of the three conditions are the same as the case of the upright condition. The detection object 5 is in contact with the inner surface of the casing 4 at two contact points, namely a first contact point 51 in contact with the second inclined surface 28 and a second contact point 52 in contact with the first parallel surface 24 functioning as a holding surface, and a gap 53 is formed between the detection object 5 and the first inclined surface 27. The angle θ1 between a first axis 54 connecting the first contact point 51 and the center of the detection object 5 and a second axis 55 connecting the second contact point 52 and the center of the detection object 5 is, for example, substantially 45 degrees which form an acute angle.

FIG. 4B is for explaining a size of a detection object 50 that is never set. The size of the detection object 50 is never set to a size as shown in FIG. 4B. That is, the detection object 50 is in contact with the first and second inclined surfaces 27 and 28 at third and fourth contact points 56 and 57, and the angle θ2 between third and fourth axes 58 and 59 connecting the third and the fourth contact points 56 and 57 and the center of the detection object 50 is, for example, 90 degrees. That is, the diameter of the detection object 50 shown in FIG. 4B is larger than the diameter of the detection object 5, the angle θ2 formed so as to be in contact with the inner surface of the casing 4 is wide and the detection object 50 is held stably, so that the detection object 50 does not easily move when the optical inclination sensor 1 is inclined.

By setting the size of the detection object 5 not to the size shown in FIG. 4B but to the size shown in FIG. 4A as mentioned above, the angle θ1 is acute and the gap 53 is present, so that the detection object 5 can smoothly move when the optical inclination sensor 1 is inclined. Consequently, the variation in the angle of inclination of the optical inclination sensor 1 at which the detection object 5 starts to move can be reduced.

Figure 5:
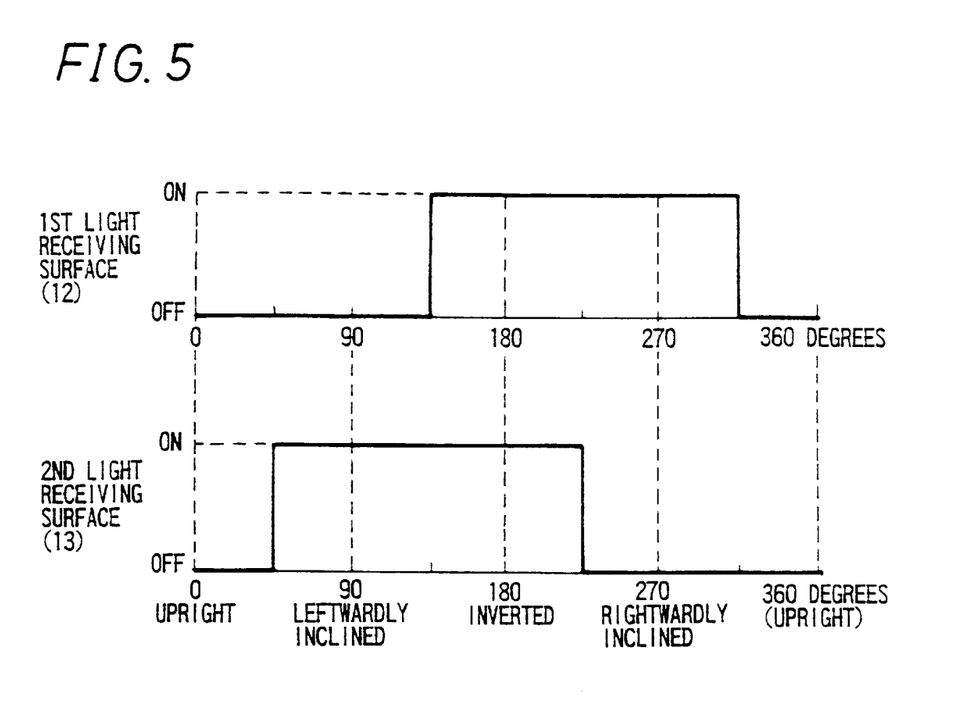
FIG. 5 is a view showing conditions of blocking and opening of paths of light from a light emitting element to first and second light receiving surfaces in four conditions, namely the upright, the leftwardly inclined, the rightwardly inclined and the inverted conditions of the optical inclination sensor.

Next, the detection of the four conditions by the optical inclination sensor 1 according to this embodiment will be described. FIG. 5 shows conditions of the blocking and opening of the paths of light from the light emitting element 8 to the first and the second light receiving surfaces 12 and 13 in the four conditions of the optical inclination sensor 1, namely the upright, the leftwardly inclined, the inverted and the rightwardly inclined conditions. When the inclination condition of the optical inclination sensor 1 changes from the upright condition where the angle of inclination is 0 degrees to the leftwardly inclined condition where the sensor 1 is inclined 90 degrees leftward on the plane of FIG. 2, the inverted condition where the sensor 1 is inclined 180 degrees and the rightwardly inclined condition where the sensor 1 is inclined 270 degrees in this order, the conditions of the paths of light from the light emitting element 8 to the first and the second light receiving surfaces 12 and 13 are changed between a blocked condition and an opened condition by the detection object 5 that moves on the inner surface of the casing 4 to be held in a different position as the inclination condition of the optical inclination sensor 1 changes.

With respect to the light receiving conditions of the first and the second light receiving surfaces 12 and 13 when the light inclination sensor 1 is in the upright, the leftwardly inclined, the inverted and the rightwardly inclined conditions, a condition where the path of light from the light emitting element 8 is opened and the light receiving surface is in the light receiving condition is represented by ON, and a condition where the path of light is blocked and the light receiving surface is not in the light receiving condition is represented by OFF. The results are shown in TABLE 1.

TABLE 1

|  | Upright (0°, 360°) | Leftwardly Inclined (90°) | Inverted (180°) | Rightwardly inclined (270°) |
| --- | --- | --- | --- | --- |
| 1st light receiving surface (12) | OFF | OFF | ON | ON |
| 2nd light receiving surface (13) | OFF | ON | ON | OFF |

When the optical inclination sensor 1 is in the upright condition, the detection object 5 is in a position held by the first parallel surface 24 functioning as a holding surface, and the detection object 5 blocks both of the paths of light from the light emitting element 8 to the first and the second light receiving surfaces 12 and 13, so that the first and the second light receiving surfaces 12 and 13 are both in the OFF condition when the angle of inclination of the optical inclination sensor 1 is in a range between plus and minus 45 degrees from 0 degrees.

When the optical inclination sensor 1 is in the leftwardly inclined condition, the detection object 5 is in a position held by the first vertical surface 25 functioning as a holding surface, the detection object 5 blocks the path of light from the light emitting element 8 to the first light receiving surface 12 and the path of light to the second light receiving surface 13 is opened, so that the first light receiving surface 12 is in the OFF condition and the second light receiving surface 13 is in the ON condition when the angle of inclination of the optical inclination sensor 1 is in a range between plus and minus 45 degrees from 90 degrees.

When the optical inclination sensor 1 is in the inverted condition, the detection object 5 is in a position held by the second parallel surface 29 functioning as a holding surface, and the detection object 5 opens both of the paths of light from the light emitting element 8 to the first and the second light receiving surfaces 12 and 13, so that the first and the second light receiving surfaces 12 and 13 are both in the ON condition when the angle of inclination of the optical inclination sensor 1 is in a range between plus and minus 45 degrees from 180 degrees.

When the optical inclination sensor 1 is in the rightwardly inclined condition, the detection object 5 is in a position held by the second vertical surface 26 functioning as a holding surface, and the detection object 5 opens the path of light from the light emitting element 8 to the first light receiving surface 12 and blocks the path of light to the second light receiving surface 13, so that the first light receiving surface 12 is in the ON condition and the second light receiving surface 13 is in the OFF condition when the angle of inclination of the optical inclination sensor 1 is in a range between plus and minus 45 degrees from 270 degrees.

Since the combination of the ON and the OFF conditions of the first and the second light receiving surfaces 12 and 13 varies according to the change of the condition of the optical inclination sensor 1 to the upright, the leftwardly inclined, the inverted or the rightwardly inclined condition as described above, the four conditions can be distinctively detected based on the combination of the ON and the OFF conditions of the first and the second light receiving surfaces 12 and 13.

According to this embodiment, when the optical inclination sensor 1 is in the upright condition, the path of light and the movement path of the detection object 5 are formed so that the first and the second light receiving surfaces 12 and 13 are both in the OFF condition, so that when the optical inclination sensor 1 is used in an apparatus used being held in the upright condition for a long time, the time for which no current flows through the light receiving element is long. Consequently, power consumption can be reduced.

Examples of apparatuses provided with the optical inclination sensor 1 of this embodiment include electronic cameras which are image pickup apparatuses. An electronic camera provided with the optical inclination sensor 1 operates in the following manner: The optical inclination sensor 1 detects that the electronic camera is in one of the upright, the rightwardly inclined, the leftwardly inclined and the inverted conditions, and inputs the detection output, for example, to a central processing unit (CPU) also provided in the electronic camera. A memory is connected to the CPU, and information on image inclination conditions is previously stored in the memory. The CPU determines the inclination condition of the image being shot from the information input from the optical inclination sensor 1 and the image inclination information read from the memory. Based on the result of the determination, the CPU outputs a control signal. In response to the output from the CPU, an image display section is controlled. When the inclination condition of the shot image is other than the upright condition, the inclination of 90 or 180 degrees of the image is corrected so that the image is displayed on the image display section with the vertical direction thereof being always correct.

Figure 6:
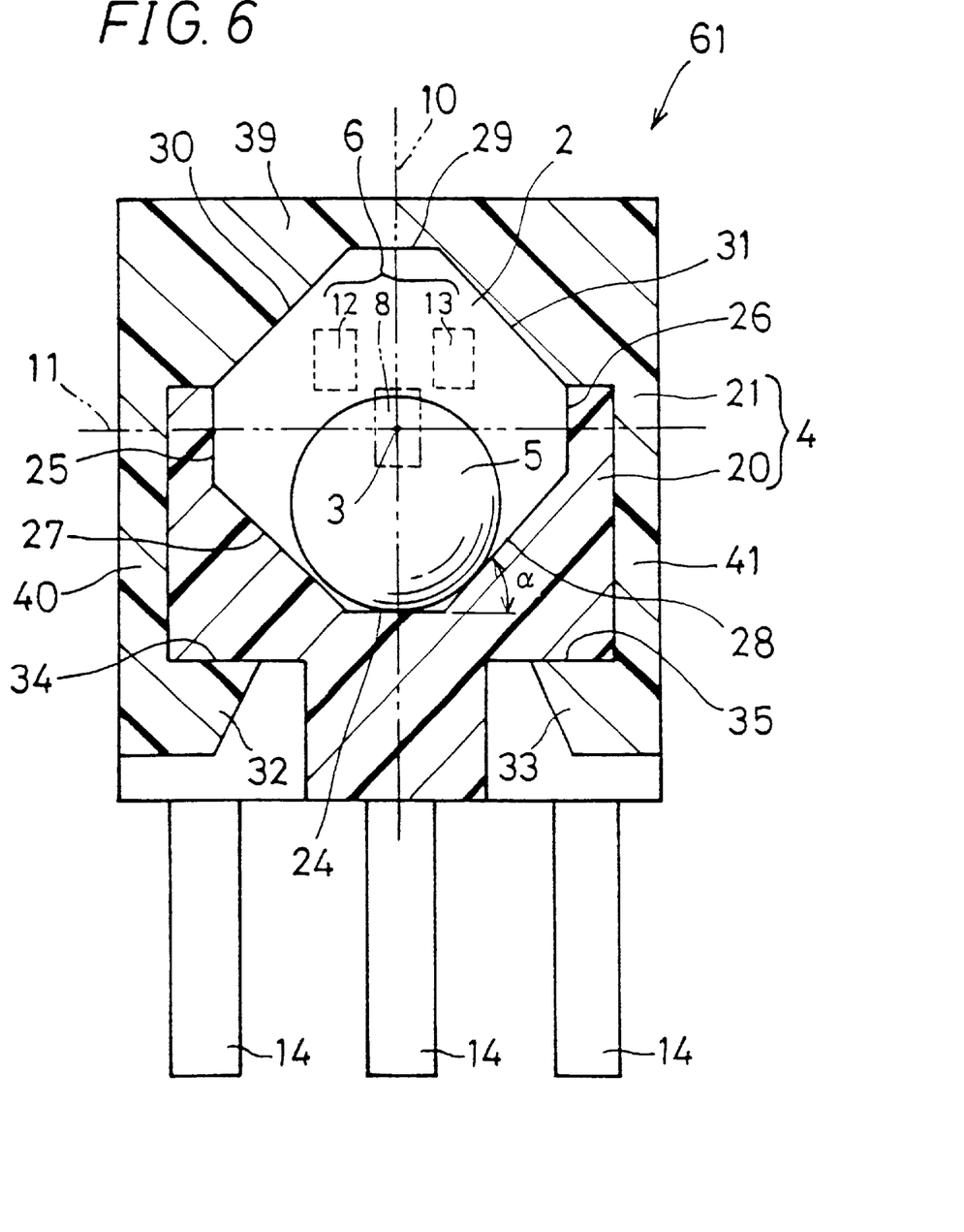
FIG. 6 is a cross-sectional view showing the structure of an optical inclination sensor according to a second embodiment of the invention in a simplified form.

FIG. 6 is a cross-sectional view showing the structure of an optical inclination sensor 61 according to a second embodiment of the invention in a simplified form. The optical inclination sensor 61 of this embodiment is similar to the optical inclination sensor 1 of the first embodiment, and corresponding parts are designated by the same reference numerals and descriptions thereof are omitted. What is noteworthy in the optical inclination sensor 61 of this embodiment is that the first and the second light receiving surfaces 12 and 13 are disposed so as to be shifted upward from the second virtual plane 11. With this structure, when the optical inclination sensor 61 is in the inverted condition, the paths of light from the light emitting element 8 to the first and the second light receiving surfaces 12 and 13 are both blocked, when the optical inclination sensor 61 is in the upright condition, the paths of light to the first and the second light receiving surfaces 12 and 13 are both opened, and when the optical inclination sensor 61 is in the rightwardly or the leftwardly inclined condition, one of the paths of light to the first and the second light receiving surfaces 12 and 13 is blocked. Consequently, when the optical inclination sensor 61 is used in an apparatus used being held in the inverted condition for a long time, the time for which no current flows through the light receiving element is long, so that power consumption can be reduced.

As described above, according to the first and the second embodiments of the invention, the inner surface of the casing 4 is octagonal within the virtual plane vertical to the axis 3, the angle between the surface parallel to horizontal and the surface inclined to horizontal and the angle between the surface vertical to horizontal and the surface inclined to horizontal are substantially 45 degrees when the holder 20 is in the upright condition, and the four conditions, namely the upright, the rightwardly inclined, the leftwardly inclined and the inverted conditions of the optical inclination sensor 1 are detected. However, the invention is not limited thereto. The inner surface of the casing 4 may have a polygonal shape with more than eight vertices within the virtual plane vertical to the axis 3 so that given inclination conditions can be detected.

While the detection object 5 is a sphere, the invention is not limited thereto. The detection object 5 may be a disk or a cylinder. While no surface treatment is performed on the detection object 5, the invention is not limited thereto. A treatment such as a surface roughing treatment may be performed on the surface of the detection object 5. While the detecting means 6 comprises a combination of a single light emitting element 8 and one light receiving element 45 having two light receiving surfaces 12 and 13, the invention is not limited thereto. The detecting means 6 may comprise a combination of a plurality of light emitting elements and a plurality of light receiving elements. While the detecting means 6 has a structure composed of a light emitting element and a light receiving element and using blocking and opening of light, the invention is not limited thereto. The detecting means 6 may have a different structure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical inclination sensor for detecting a condition of inclination of an object to horizontal, the optical inclination sensor comprising:
    a light emitting section including a light emitting element;
    a light receiving section including a light receiving element having two light receiving surfaces;
    a movable detection object for adjusting a light receiving condition of the light receiving section by blocking or opening paths of light from the light emitting section to the light receiving section;
    a holder for housing the light emitting section, the light receiving section and the detection object, the holder having an inner surface including surfaces parallel to, vertical to and inclined to a horizontal plane when the holder is in an upright condition; and
    a lid shaped to fit to the holder, the lid having an inner surface including surfaces parallel to and inclined to the horizontal plane when the holder is in the upright condition and the lid is fitted thereto,
    wherein the detection object is movably housed in a housing space defined by the holder and the lid, and the path of light and the movement path of the detection object are formed so that the following conditions are distinctively detectable according to a position along the movement path of the detection object in the housing space:
        the upright condition of the holder;
        a rightwardly inclined condition of the holder;
        a leftwardly inclined condition of the holder; and
        an inverted condition of the holders,
        the parallel surfaces of the lid physically contact outside parallel surfaces of the holder, and the lid has a bottom inside surface that physically contacts an outside bottom surface of the holder.

2. The optical inclination sensor of claim 1,
    wherein the detection object is a sphere having a specific gravity of 7 or more and a diameter of 1.2 to 3.0 mm.

3. The optical inclination sensor of claim 2, wherein the detection object has a surface roughness smaller than a predetermined value.

4. The optical inclination sensor of claim 1,
    wherein there are four inclined surfaces in all in the inner surfaces of the holder and the lid, and when the holder is in the upright condition and the lid is fitted thereto, angles between the surfaces parallel to horizontal and the inclined surfaces and angles between the surfaces vertical to the horizontal plane and the inclined surfaces are substantially 45 degrees.

5. The optical inclination sensor of claim 2, wherein the holder and the lid have between adjoining inclined surfaces a holding surface formed so as to range from one to the other of the inclined surfaces, and the detection object is in contact with the inner surfaces of the holder and the lid defining the housing space at two contact points, namely a first contact point in contact with an inclined surface and a second contact point in contact with the holding surface.

6. The optical inclination sensor of claim 5, wherein an angle between a first axis connecting the first contact point and a center of the detection object and a second axis connecting the second contact point and the center of the detection object is substantially 45 degrees.

7. The optical inclination sensor of claim 1,
    wherein a distance between the two light receiving surfaces is set to 0.5 to 1.5 mm.

8. The optical inclination sensor of claim 3, wherein the detection object is stainless steel.

9. The optical inclination sensor of claim 8, wherein the stainless steel is an untreated sphere.

10. An optical inclination sensor for detecting a condition of inclination of an object to horizontal, the optical inclination sensor comprising:
    a light emitting section including a light emitting element;
    a light receiving section including a light receiving element having two light receiving surfaces;
    a movable detection object for adjusting a light receiving condition of the light receiving section by blocking or opening paths of light from the light emitting section to the light receiving section;

a holder for housing the light emitting section, the light receiving section and the detection object, the holder having an inner surface including surfaces parallel to, vertical to and inclined to a horizontal axis when the holder is in an upright condition; and a lid shaped to fit to the holder, the lid having an inner surface including surfaces parallel to and inclined to the horizontal axis when the holder is in the upright condition and the lid is fitted thereto, wherein the detection object is movably housed in a housing space defined by the holder and the lid, and the path of light and the movement path of the detection object are formed so that the following conditions are distinctively detectable according to a position along the movement path of the detection object in the housing space:
the upright condition of the holder;
a rightwardly inclined condition of the holder;
a leftwardly inclined condition of the holder; and
an inverted condition of the holder wherein the path of light and the movement path of the detection object are formed so that when the holder is in the upright condition, paths of lights from the light emitting section to the two light receiving surfaces are both blocked by the detection object, when the holder is in the rightwardly or the leftwardly inclined condition, one of the paths of light from the light emitting section to the two light receiving surfaces is blocked by the detection object, and when the holder is in the inverted condition, the paths of light from the light emitting section to the two light receiving surfaces is blocked by the detection object, and when the holder is in the inverted condition, the paths of light from the light emitting section to the two light receiving surfaces are both opened.

11. An optical inclination sensor for detecting a condition of inclination of an object to horizontal, the optical inclination sensor comprising:

a light emitting section including a light emitting element;

a light receiving section including a light receiving element having two light receiving surfaces;

a movable detection object for adjusting a light receiving condition of the light receiving section by blocking or opening paths of light from the light emitting section to the light receiving section;

a holder for housing the light emitting section, the light receiving section and the detection object, the holder having an inner surface including surfaces parallel to, vertical to and inclined to a horizontal axis when the holder is in an upright condition; and a lid shaped to fit to the holder, the lid having an inner surface including surfaces parallel to and inclined to the horizontal axis when the holder is in the upright condition and the lid is fitted thereto, wherein the detection object is movably housed in a housing space defined by the holder and the lid, and the path of light and the movement path of the detection object are formed so that the following conditions are distinctively detectable according to a position along the movement path of the detection object in the housing space:
the upright condition of the holder;
a rightwardly inclined condition of the holder;
a leftwardly inclined condition of the holder; and
an inverted condition of the holder wherein the paths of light and the movement path of the detection object are formed so that when the holder is in the upright condition, the paths of light from the light emitting section to the two light receiving surfaces are both opened.

* * * * *